1,969,110

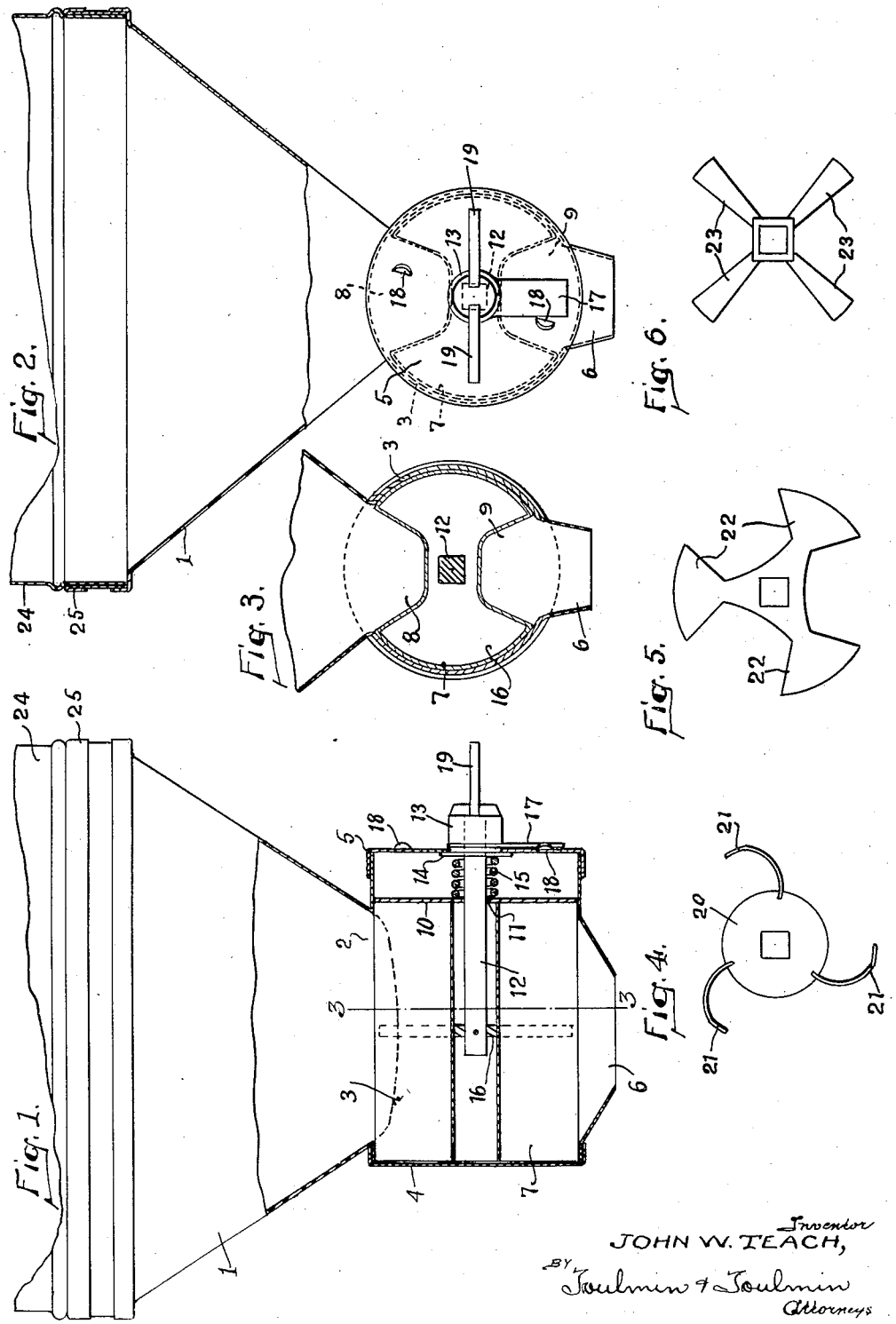
Aug. 7, 1934. J. W. TEACH 1,969,110
MEASURING DEVICE
Filed May 29, 1933
JOHN W. TEACH, Inventor Patented Aug. 7, 1934

UNITED STATES PATENT OFFICE 1,969,110

MEASURING DEVICE

John W. Teach, Springfield, Ohio, assignor of one-fourth to Warren H. Teach and one-half to Albert R. Teach, both of Springfield, Ohio Application May 29, 1933, Serial No. 673,453

9 Claims. (Cl. 221—106)

This invention relates to improvements in devices for measuring and discharging small quantities of material, such as coffee, and other similar substances.

It is particularly the object of this invention to provide, in connection with a receptacle, means for receiving a definite quantity of material from the receptacle and delivering it through an outlet chute.

It is an object of this invention to provide, in connection with a hopper or some similar container, a cylinder connected to the hopper by means of a passageway, and means in the cylinder for separating and discharging a definite quantity of the material contained in the hopper.

It is the special object of this invention to provide a yielding cylinder and a rotor for sealing and measuring, of thin yielding material, so as to provide a yielding seal between the outlet and the inlet of the rotor.

These and other advantages will appear from the following description taken in connection with the drawing.

Referring to the drawing:

Figure 1 is a side elevation of the device with the lower part thereof shown in section.

Figure 2 is a view taken from the righthand end of Figure 1.

Figure 3 is a section on the line 3—3 of Figure 1.

Figure 4 is a view showing a modified form of measuring cylinder.

Figures 5 and 6 show still other forms of measuring cylinders.

The numeral 1 is used to designate a hopper or receptacle which has at its lower end an outlet or discharge opening 2, which leads into a cylinder 3, which has a closed end 4 and an open end closed by means of a removable cap 5. In the present instance the hopper or receptacle 1 is cone-shaped, with an opening in the small end thereof so that material will pass freely from the hopper or receptacle into the cylinder.

In the cylinder, on the side opposite the outlet or discharge opening 2, there is a discharge spout 6 through which the measured material is discharged from the cylinder, after it has been selected from the bulk of the material in the hopper. In the cylinder is a measuring means, such as a measuring cylinder 7. This measuring cylinder is pressed in on opposite sides to form two troughs 8 and 9, which may vary in size according to the quantity of material desired to be discharged through the spout 6.

The measuring cylinder is inserted within the cylinder 3, with one end in contact with the closed end of the cyinder 3. In the open end of the cylinder 3 is inserted a disc 10, which closely engages the other end of the measuring cylinder and cooperates with the closed end of the cylinder 3 to form end walls with the troughs of the measuring cylinder.

The disc 10 and the cap 5 each has in its center a hole 11 through which a shaft 12 extends into the cylinder. On the outer end of this shaft is a head 13, which engages the outer surface of the cap. On the shaft 12 within the cap is a washer 14, and between this washer 14 and the disc 10, and around the shaft, is a spring 15 which serves to hold the disc against the end of the measuring cylinder.

The measuring cylinder is rotated by means of a pressure plate 16, suitably attached to the inner end of the shaft and engaging the inner surfaces of the troughs for rotating the measuring cylinder so that the troughs will successively pass by the discharge opening and by the discharge spout. On the shaft 12 just without the cap, and between the cap and the head, is a spring plate 17 adapted to pass over two projections 18 for indicating in the rotation of the shaft the filling and the discharging positions of the measuring cylinder. On the outer end of the shaft 12 are wings 19, by which the shaft is rotated.

In Figure 4 there is shown a modified form of measuring trough. In this form there is shown a cylinder 20, which has projecting therefrom a plurality of arcuate trough members 21. In the present instance there are three of these trough members, though a greater or less number of troughs may be used. In Figure 5 a slightly modified form of measuring trough is shown, as indicated by the numeral 22. In Figure 6 still another form of trough 23 is shown.

While the device is adapted to be used for measuring many kinds of materials used in small amounts, it is particularly well adapted to be used for measuring coffee. And for that purpose the member 1 may be used as a cover for a coffee can 24, partly shown in section in Figure 2. The flange 25 of the member 1 fits around the mouth of the can.

When the parts are in the position shown in Figure 3 the material in the hopper extends into the trough 8. By rotating the shaft 12 and the measuring cylinder this trough is shifted from its position, as shown in Figure 3, to the position occupied by the trough 9 so that the material in the trough 8 is dumped out through the chute or discharge spout 6. At the same time the trough 9 has been filled by material from the hopper. During the time that the troughs are being shifted the outlet 2 is closed by the walls of the measuring cylinder so that no material can escape from the hopper except when one of the troughs is immediately below the outlet or discharge opening 2.

It will be understood that it is desired to comprehend within this invention such modifications as come within the scope of the claims and the invention.

Having thus fully described the invention, what is claimed as new and desired to be secured by Letters Patent, is:

1. In combination, a receptacle, a cylinder on the receptacle, said cylinder having on one side an opening into the receptacle and opposite the opening a discharge spout, a rotating cylinder member in the cylinder having a pocket therein to receive a measured amount of material from the receptacle and discharge it through the spout, and means in the rotating cylinder to engage the pocket to rotate the cylinder.

2. In combination, a hopper having at its lower end an outlet, a cylinder on the hopper to receive material from the hopper through the outlet, said cylinder having a discharge spout, a rotating cylinder member in the cylinder having in its periphery troughs to receive a measured amount of material from the hopper and discharge it through the spout, said cylinder member acting to close the outlet between the receiving and the discharging of the material, and means in the cylinder member engaging the troughs to rotate said member.

3. In combination, a hollow cylinder closed at one end and open at its other end, said cylinder having an inlet opening on one side and a discharge spout opposite the opening, a cap for closing the open end of the cylinder, a rotating cylinder member on the cap in the hollow cylinder, said cylinder member having in its periphery troughs for receiving through the inlet opening a measured quantity of material and discharging it through the spout, and a disc in the cylinder member having notches to receive the troughs whereby said member may be rotated.

4. In combination, a hollow cylinder closed at one end and open at its other end, a hopper on the cylinder having an outlet into the cylinder, an outlet spout on the cylinder, a measuring cylinder closely fitting in the first-named cylinder and engaging at one end the closed end of the first cylinder, said measuring cylinder having measuring troughs therein, a disc in the first-named cylinder fitting against the other end of the measuring cylinder, a cap on the open end of the first-named cylinder, a spring between the cap and the disc for holding the disc in place, and means on the cap to rotate the measuring cylinder.

5. In combination, a hollow cylinder closed at one end and open at its other end, a hopper on the cylinder having an outlet into the cylinder, an outlet spout on the cylinder, a measurng cylinder closely fitting in the first-named cylinder and engaging at one end the closed end of the first cylinder, said measuring cylinder having measuring troughs therein, a disc in the first-named cylinder fitting against the other end of the measuring cylinder, a cap on the open end of the first-named cylinder, a spring between the cap and the disc for holding the disc in place, and means on the cap to rotate the measuring cylinder, said means comprising a shaft having a pressure plate thereon to engage the measuring cylinder.

6. In combination, a hollow cylinder closed at one end and open at its other end, a hopper on the cylinder having an outlet into the cylinder, an outlet spout on the cylinder, a measuring cylinder closely fitting in the first-named cylinder and engaging at one end the closed end of the first cylinder, said measuring cylinder having measuring troughs therein, a disc in the first-named cylinder fitting against the other end of the measuring cylinder, a cap on the open end of the first-named cylinder, a spring between the cap and the disc for holding the disc in place, and means on the cap to rotate the measuring cylinder, said means comprising a shaft having a pressure plate thereon to engage the measuring cylinder between the troughs.

7. In combination, a hollow cylinder closed at one end and open at its other end, a hopper on the cylinder having an outlet into the cylinder, an outlet spout on the cylinder, a measuring cylinder closely fitting in the first-named cylinder and engaging at one end the closed end of the first cylinder, said measuring cylinder having troughs therein, a disc in the first-named cylinder fitting against the other end of the measuring cylinder, a cap on the open end of the first-named cylinder, the cap and the disc each having a hole therein, a shaft in said holes, a spring around the shaft between the cap and the disc to hold the disc in place, and means on the shaft to rotate the measuring cylinder.

8. In combination, a hollow cylinder closed at one end and open at its other end, a hopper on the cylinder having an outlet into the cylinder, an outlet spout on the cylinder, a measuring cylinder closely fitting in the first-named cylinder and engaging at one end the closed end of the first cylinder, said measuring cylinder having troughs therein, a disc in the first-named cylinder fitting against the other end of the measuring cylinder, a cap on the open end of the first-named cylinder, the cap and the disc each having a hole therein, a shaft in said holes, a spring around the shaft between the cap and the disc to hold the disc in place, and means on the shaft to rotate the measuring cylinder, said means consisting of a pressure plate engaging the measuring cylinder between the troughs.

9. In combination, a hollow cylinder closed at one end and open at its other end, a hopper on the cylinder having an outlet into the cylinder, an outlet spout on the cylinder, a measuring cylinder closely fitting in the first-named cylinder and engaging at one end the closed end of the first cylinder, said measuring cylinder having troughs therein, a disc in the first-named cylinder fitting against the other end of the measuring cylinder, a cap on the open end of the first-named cylinder, the cap and the disc each having a hole therein, a shaft in said holes, a spring around the shaft between the cap and the disc to hold the disc in place, and means on the shaft to rotate the measuring cylinder, said means consisting of a pressure plate loosely engaging the measuring cylinder between the troughs.

JOHN W. TEACH.